US010259347B2

(12) United States Patent
Kim et al.

(10) Patent No.: US 10,259,347 B2
(45) Date of Patent: Apr. 16, 2019

(54) VEHICLE SEAT DEVICE

(71) Applicant: NHK SPRING CO., LTD., Yokohama-shi (JP)

(72) Inventors: Donhyon Kim, Yokohama (JP); Daisuke Tanaka, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/629,603

(22) Filed: Jun. 21, 2017

(65) Prior Publication Data

US 2017/0368964 A1  Dec. 28, 2017

(30) Foreign Application Priority Data

Jun. 23, 2016 (JP) ................. 2016-124707

(51) Int. Cl.
| | | |
|---|---|---|
| *B60N 2/14* | (2006.01) | |
| *B60N 2/02* | (2006.01) | |
| *B60N 2/06* | (2006.01) | |
| *B60N 2/22* | (2006.01) | |
| *B60N 2/005* | (2006.01) | |

(52) U.S. Cl.
CPC ............ *B60N 2/14* (2013.01); *B60N 2/0232* (2013.01); *B60N 2/0244* (2013.01); *B60N 2/06* (2013.01); *B60N 2/062* (2013.01); *B60N 2/067* (2013.01); *B60N 2/22* (2013.01); *B60N 2002/0055* (2013.01); *B60N 2002/024* (2013.01); *B60N 2002/0256* (2013.01)

(58) Field of Classification Search
CPC ...... B60N 2/0252; B60N 2/14; B60N 2/0232; B60N 2/0244; B60N 2/06; B60N 2/062; B60N 2/067; B60N 2/22; B60N 2002/0055; B60N 2002/024; B60N 2002/0256

See application file for complete search history.

(56) References Cited

U.S. PATENT DOCUMENTS

| | | | | |
|---|---|---|---|---|
| 7,647,151 | B2 * | 1/2010 | Abt ..................... | B60N 2/0244 297/240 |
| 9,597,983 | B2 * | 3/2017 | Strasdat ................. | B60R 7/04 |
| 9,815,386 | B2 * | 11/2017 | Hozumi ............... | B60N 2/0224 |
| 2009/0195037 | A1 * | 8/2009 | Plavetich ................ | B60N 2/01 297/257 |

(Continued)

FOREIGN PATENT DOCUMENTS

| | | |
|---|---|---|
| JP | H10-86712 | 4/1998 |
| JP | H11-11191 | 1/1999 |

(Continued)

*Primary Examiner* — Philip F Gabler
(74) *Attorney, Agent, or Firm* — Knobbe, Martens, Olson & Bear, LLP

(57) ABSTRACT

A vehicle seat device comprises: a seat disposed at a vehicle width direction inner side of a side door of a vehicle; a rotating mechanism that rotates the seat about a vertical axis relative to a vehicle body; a sideways movement mechanism that moves the seat in a vehicle width direction relative to the vehicle body between a normal region and an inner region; and a control device which, when causing the rotating mechanism to rotate the seat, causes the sideways movement mechanism to move the seat from the normal region to the inner region before the rotation.

4 Claims, 14 Drawing Sheets

(56) References Cited

U.S. PATENT DOCUMENTS

| | | | |
|---|---|---|---|
| 2009/0218865 A1* | 9/2009 | Fukui | B60N 2/14 297/313 |
| 2016/0152163 A1* | 6/2016 | Strasdat | B60R 7/04 296/64 |
| 2016/0229313 A1* | 8/2016 | Hozumi | B60N 2/0224 |
| 2016/0332539 A1* | 11/2016 | Rawlinson | B60N 2/0244 |
| 2017/0050539 A1* | 2/2017 | Akimoto | B60N 2/0232 |
| 2017/0368964 A1* | 12/2017 | Kim | B60N 2/0232 |

FOREIGN PATENT DOCUMENTS

| | | |
|---|---|---|
| JP | 2007-261522 | 10/2007 |
| JP | 2015-209193 | 11/2015 |

* cited by examiner

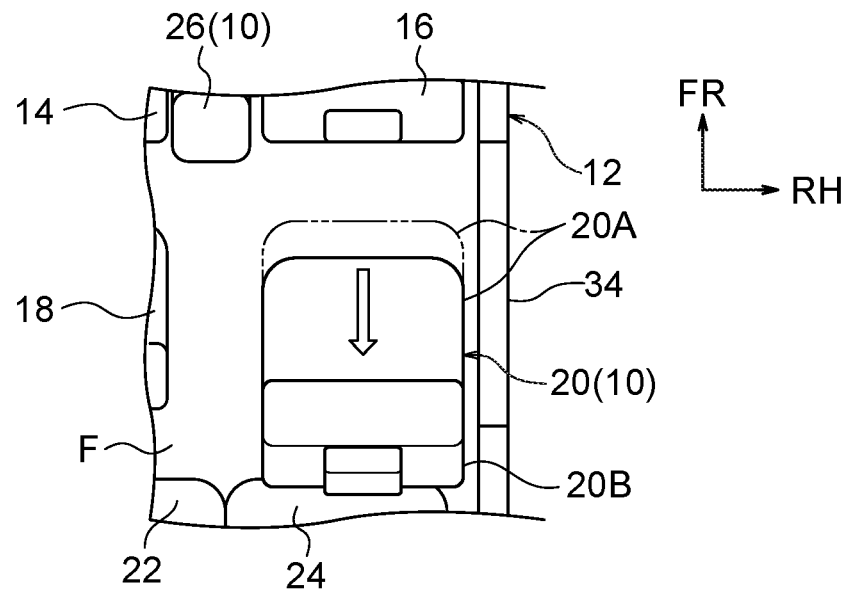
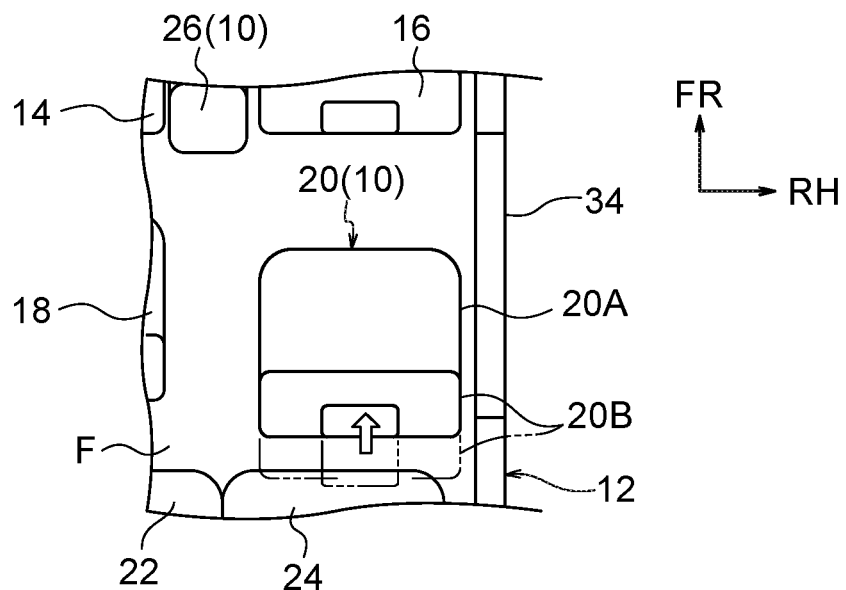

VEHICLE SEAT DEVICE

CROSS-REFERENCE TO RELATED APPLICATION

This application is based on and claims priority under 35 USC 119 from Japanese Patent Application No. 2016-124707 filed on Jun. 23, 2016, the disclosure of which is incorporated by reference herein.

BACKGROUND

Technical Field

The present invention relates to a vehicle seat device that can rotate a seat about a vertical axis relative to a vehicle body.

Related Art

Japanese Patent Application No. 2015-209193 discloses a seat operation control device for rotating a seat that has an operation component for adjusting the position of the seat and is rotatable about a vertical axis. In this seat operation control device, a second-row seat disposed to the side of a rear side door in a vehicle such as a minivan is slidable sideways in a range of S2 both inward in the vehicle width direction and outward in the vehicle width direction.

Additionally, in a case where the sideways sliding position is within ST2 on both the vehicle width direction inner side and the vehicle width direction outer side and other operation components (a seat back, a footrest, etc.) are positioned in a seat rotatable range, the seat is rotated about a vertical axis without interfering with the rear side door even in a state in which the rear side door is closed.

However, the seat operation control device with the above-described configuration ensures space for sliding sideways in a range of S2 on both the vehicle width direction inner side and the vehicle width direction outer side of the seat. For this reason, in a case where the seat operation control device is applied to a vehicle whose vehicle width dimension is small, the need to reduce the width dimension of the seat arises, so there is the potential for the comfort level of the seat to be compromised.

SUMMARY

In view of the above-described circumstances, it is an object of the present invention to obtain a vehicle seat device that can prevent a seat rotated about a vertical axis relative to a vehicle body from interfering with a side door in a closed state and with which it is easy to ensure the width dimension of the seat.

A vehicle seat device pertaining to an invention according to a first aspect includes: a seat disposed at a vehicle width direction inner side of a side door of a vehicle; a rotating mechanism that rotates the seat about a vertical axis relative to a vehicle body; a sideways movement mechanism that moves the seat in a vehicle width direction relative to the vehicle body between a normal region, in which the seat is normally disposed and in which rotation about the vertical axis is limited because of interference between the side door in a closed state and the seat, and an inner region, which is set at a vehicle width direction inner side of the normal region and in which the seat is rotatable about the vertical axis without interfering with the side door in a closed state; and a control device which, when causing the rotating mechanism to rotate the seat, causes the sideways movement mechanism to move the seat from the normal region to the inner region before the rotation.

In the first aspect, when the control device causes the rotating mechanism to rotate, about the vertical axis relative to the vehicle body, the seat disposed at the vehicle width direction inner side of the side door of the vehicle, the control device causes the sideways moving mechanism to move the seat from the normal region to the inner region before the rotation. In the state in which the seat is disposed in the normal region, rotation of the seat about the vertical axis is limited because of interference between the side door in the closed state and the seat. On the other hand, in the state in which the seat is disposed in the inner region, the seat is rotatable about the vertical axis without interfering with the side door in the closed state. For this reason, when the seat is moved to the inner region and is subsequently rotated about the vertical axis as described above, interference between the seat and the side door is prevented. Moreover, it suffices to ensure space for vehicle width direction movement (sideways movement) only on the vehicle width direction inner side of the normal region in which the seat is normally disposed, so it becomes easy to ensure the width dimension of the seat.

A vehicle seat device pertaining to a second aspect is the vehicle seat device according to the first aspect, further including an obstacle disposed at a vehicle width direction inner side of the seat positioned in the normal region; and an obstacle movement mechanism that moves the obstacle out of a rotational region of the seat, wherein the control device causes the obstacle movement mechanism to move the obstacle out of the rotational region before causing the sideways movement mechanism to move the seat from the normal region to the inner region.

In the vehicle seat device according to the second aspect, the control device causes the obstacle movement mechanism to move the obstacle (e.g., a center console, a center seat, etc.) out of the rotational region of the seat before causing the sideways movement mechanism to move the seat from the normal region to the inner region. Because of this, even in a configuration equipped with an obstacle disposed on the vehicle width direction inner side of the seat positioned in the normal region, it becomes possible to rotate the seat about the vertical axis in the closed state of the side door.

A vehicle seat device pertaining to a third aspect further includes a forward and rearward movement mechanism that moves the seat in forward and rearward directions relative to the vehicle body and which has forward and rearward direction reference positions set in a movement range of the forward and rearward directions; and a reclining mechanism that tilts a seat back of the seat relative to a seat cushion of the seat and which has an inclination reference position set in a tilting range of the seat back, wherein the control device causes the forward and rearward movement mechanism to move the seat to the forward and rearward direction reference positions and causes the reclining mechanism to move the seat back to the inclination reference position before causing the sideways movement mechanism to move the seat from the normal region to the inner region.

In the vehicle seat device according to the third aspect, the control device causes the forward and rearward movement mechanism to move the seat to the forward and rearward direction reference positions and causes the reclining mechanism to move the seat back to the inclination reference position before causing the sideways movement mechanism to move the seat from the normal region to the inner region. That is to say, the seat is moved in the vehicle width direction after the forward and rearward direction position of the seat and the inclination position of the seat back have been adjusted to specific positions. For this reason, compared to a configuration where the seat is moved in the vehicle width direction in a state in which the forward and rearward direction position of the seat and the inclination position of the seat back are unspecified, it becomes easier to prevent interference between the seat and peripheral objects.

As described above, according to the vehicle seat device pertaining to the present invention, a seat rotated about a vertical axis relative to a vehicle body can be prevented from interfering with a side door in a closed state, and it is easy to ensure the width dimension of the seat.

BRIEF DESCRIPTION OF THE DRAWINGS

Exemplary embodiments of the present invention will be described in detail based on the following figures, wherein:

FIG. 10B is a plan view, corresponding to part of FIG. 10A, showing a state in which the seat has been moved to a first forward and rearward direction reference position;

FIG. 10C is a plan view, corresponding to part of FIG. 10A, showing a state in which a seat back has been moved to an inclination reference position;

DETAILED DESCRIPTION

Figure 1:
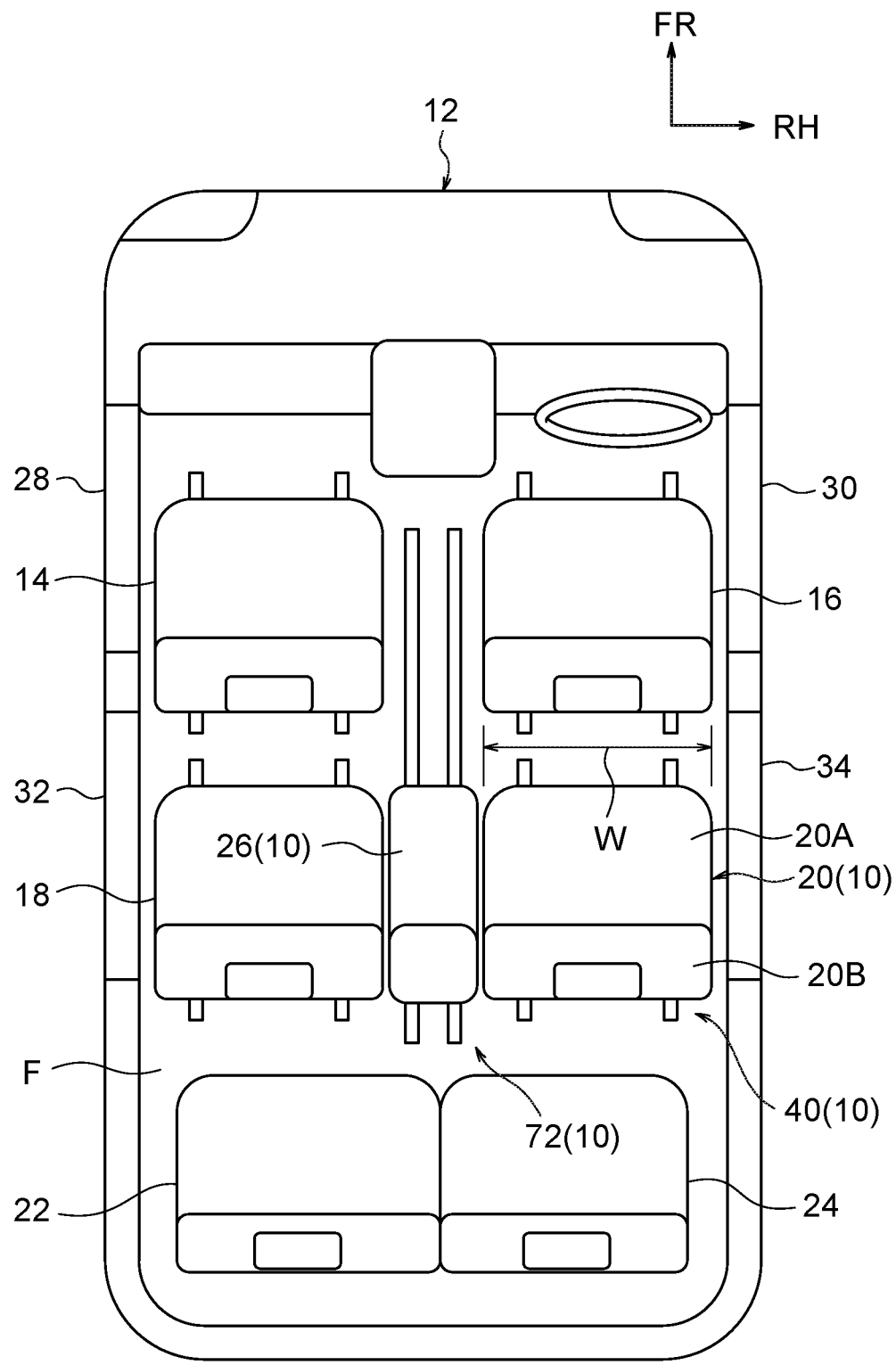
FIG. 1 is a schematic plan view showing, in a state in which illustration of a roof is omitted, a vehicle to which a vehicle seat device pertaining to the embodiment of the present invention has been applied.

A vehicle seat device 10 pertaining to an embodiment of the present invention will be described below using FIG. 1 to FIG. 11E. It will be noted that arrow FR, arrow UP, and arrow RH appropriately shown in the drawings indicate a forward direction, an upward direction, and a rightward direction, respectively, of a vehicle 12 to which the vehicle seat device 10 has been applied. Hereinafter, when description is given simply using the directions of front/rear, upper/lower, and right/left, these will be understood to mean front/rear in the vehicle forward and rearward direction, upper/lower in the vehicle upward and downward direction, and right/left in the vehicle rightward and leftward direction (vehicle width direction).

As shown in FIG. 1, the vehicle 12 pertaining to the present embodiment is a minivan type of automobile, for example, and is equipped with right and left front-row seats 14 and 16, right and left second-row seats 18 and 20, and right and left third-row seats 22 and 24. Furthermore, the vehicle 12 is equipped with a center console 26 that can be selectively disposed between the right and left front-row seats 14 and 16 and between the right and left second-row seats 18 and 20. The vehicle seat device 10 pertaining to the present embodiment is configured to include the second-row seat 20 and the center console 26, and the second-row seat 20 corresponds to the "seat" in the present invention. Furthermore, the center console 26 corresponds to the "obstacle" in the present invention.

It will be noted that in FIG. 1 is shown a state in which right and left front side doors 28 and 30 and right and left rear side doors 32 and 34 of the vehicle 12 are closed (hereinafter called "the closed state"). The right and left rear side doors 32 and 34 are sliding doors, for example. The second-row seat 20 is disposed on the vehicle width direction inner side of the rear side door 34 in the closed state. The rear side door 34 corresponds to the "side door" in the present invention.

Figure 2:
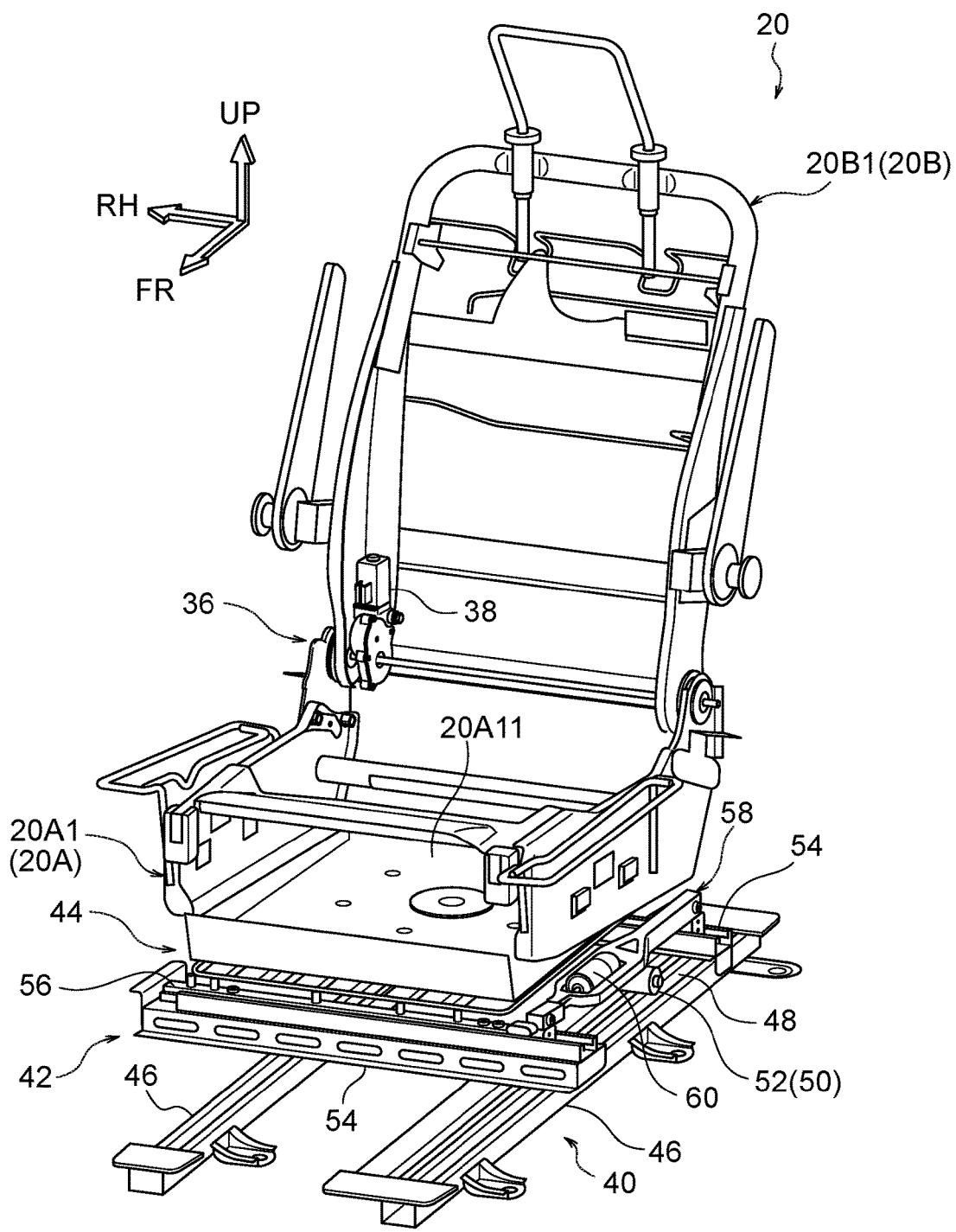
FIG. 2 is a perspective view showing the configurations of main portions of the vehicle seat device.

As shown in FIG. 2, the second-row seat 20 is equipped with a cushion frame 20A1, which configures a frame for a seat cushion 20A, and a back frame 20B1, which configures a frame for a seat back 20B. Pads covered by covers (none are shown in FIG. 2) are put over the cushion frame 20A1 and the back frame 20B1. The lower end portion of the back frame 20B1 is coupled via a reclining mechanism 36 to the rear end portion of the cushion frame 20A1. The reclining mechanism 36 uses the driving force of a motor 38 to tilt the back frame 20B1 about a horizontal axis of the vehicle body relative to the cushion frame 20A1.

Figure 3:
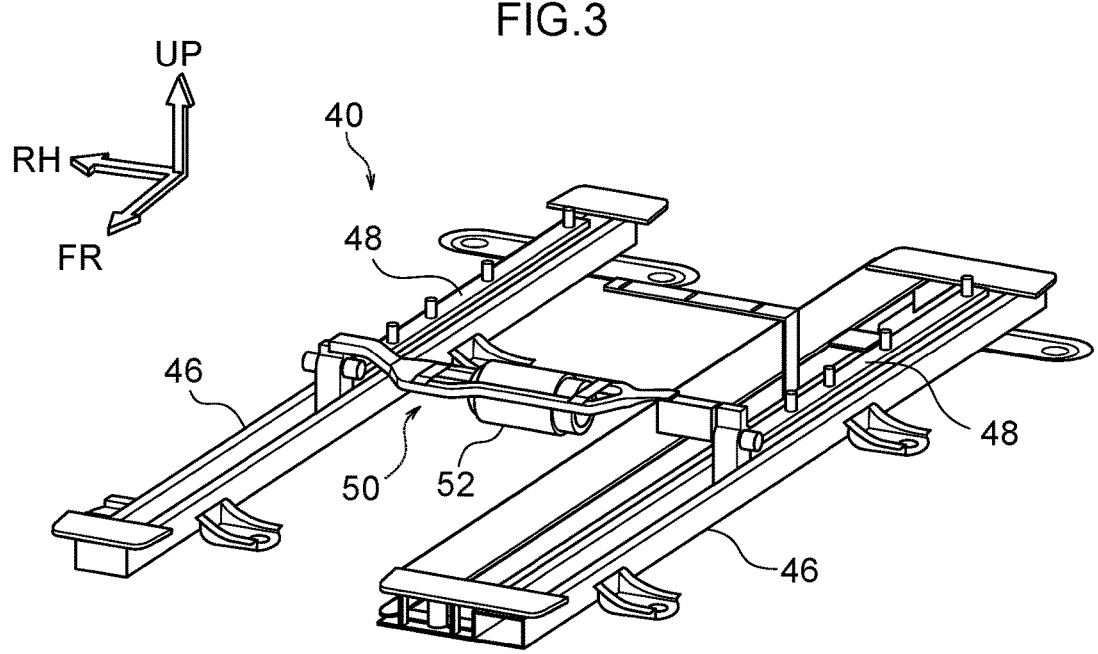
FIG. 3 is a perspective view of a forward and rearward sliding mechanism with which the vehicle seat device is equipped.

The cushion frame 20A1 is coupled via a forward and rearward sliding mechanism 40 serving as a forward and rearward movement mechanism, a sideways sliding mechanism 42 serving as a sideways movement mechanism, and a rotating mechanism 44 to a floor F of the vehicle body. As shown in FIG. 3, the forward and rearward sliding mechanism 40 is equipped with a right and left pair of lower rails 46, a right and left pair of upper rails 48, and a forward and rearward actuator 50. The right and left lower rails 46 are secured to the floor F of the vehicle body (see FIG. 1) in such a way that their longitudinal direction coincides with the forward and rearward direction. The right and left upper rails 48 are supported so as to be slidable in the forward and rearward directions relative to the right and left lower rails 46. The forward and rearward actuator 50 uses the driving force of a motor 52 to move (slide) the right and left upper rails 48 in the forward and rearward directions relative to the right and left lower rails 46.

Figure 4:
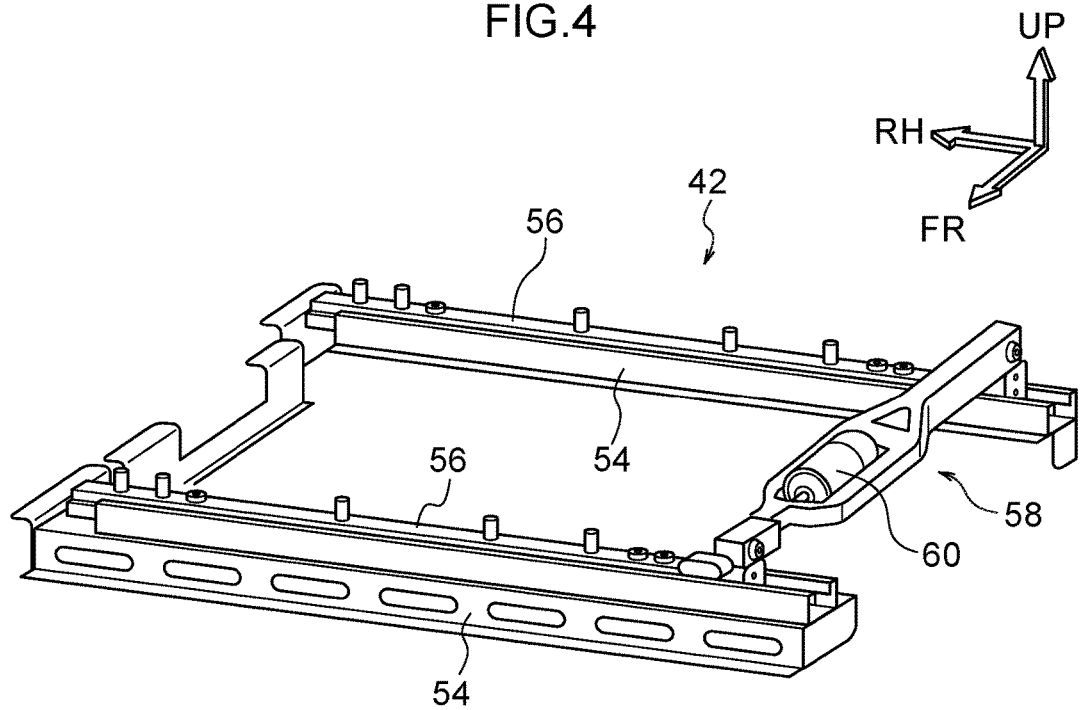
FIG. 4 is a perspective view of a sideways sliding mechanism with which the vehicle seat device is equipped.

As shown in FIG. 4, the sideways sliding mechanism 42 is equipped with a front and rear pair of lower rails 54, a front and rear pair of upper rails 56, and a rightward and leftward actuator 58. The front and rear lower rails 54 are secured to the right and left upper rails 48 in such a way that their longitudinal direction coincides with the rightward and leftward direction (vehicle width direction). The front and rear upper rails 56 are supported so as to be slidable in the rightward and leftward directions relative to the front and rear lower rails 54. The rightward and leftward actuator 58 uses the driving force of a motor 60 to move (slide) the front and rear upper rails 56 in the rightward and leftward directions relative to the front and rear lower rails 54.

Figure 5:
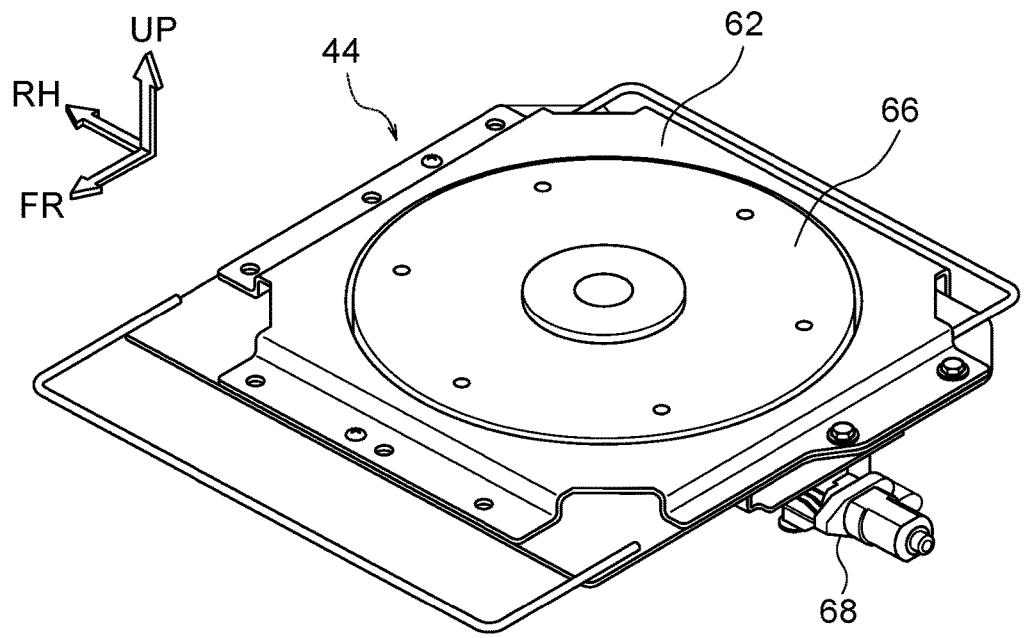
FIG. 5 is a perspective view, as seen from above, of a rotating mechanism with which the vehicle seat device is equipped.
Figure 6:
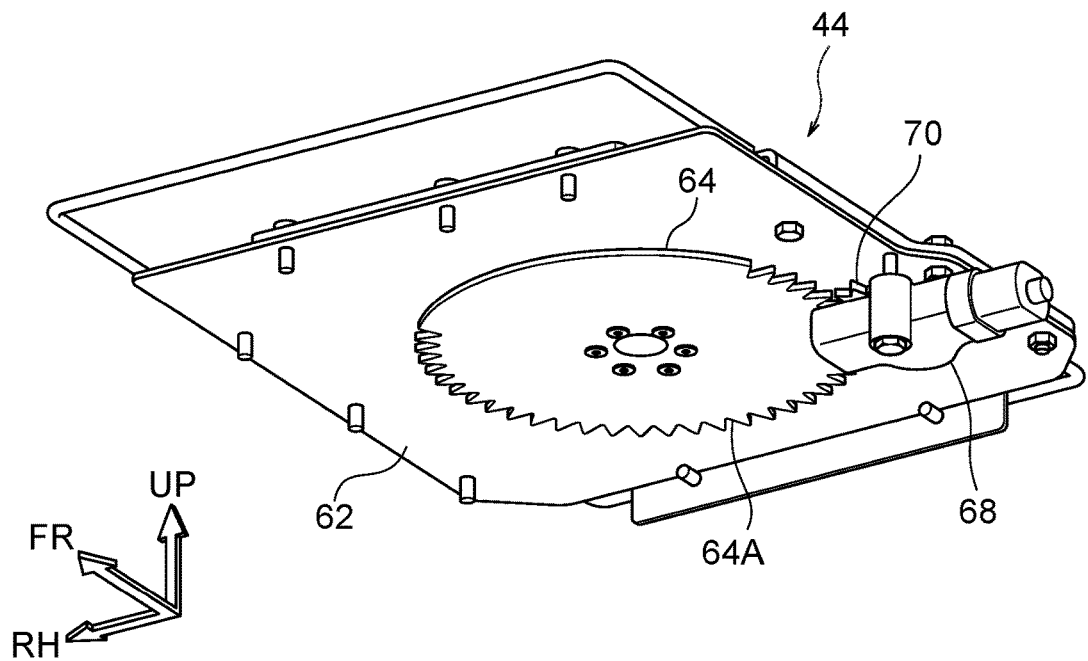
FIG. 6 is a perspective view, as seen from below, of the rotating mechanism.

As shown in FIG. 5 and FIG. 6, the rotating mechanism 44 is equipped with a bracket 62, a gear 64, a rotating plate 66, and a motor 68. The bracket 62 is formed in the shape of a substantially rectangular plate as seen in a plan view, and is secured to the front and rear upper rails 56 in such a way that its thickness direction coincides with the upward and downward direction. The gear 64 is formed in the shape of a disc, is disposed under the bracket 62 in such a way that its axial direction coincides with the upward and downward direction, and is supported so as to be rotatable about a vertical axis of the vehicle body relative to the bracket 62. The rotating plate 66 is formed in the shape of a disc, is disposed above the bracket 62 in such a way that its axial direction coincides with the upward and downward direction, and is supported so as to be rotatable about a vertical axis of the vehicle body relative to the bracket 62. The central portions of the rotating plate 66 and the gear 64 are joined to each other so that the rotating plate 66 and the gear 64 integrally rotate. Outer teeth 64A are formed on the outer periphery of the gear 64. A pinion 70 secured to an output shaft of the motor 68 is meshed with the outer teeth 64A.

The motor 68 is disposed under the bracket 62 and is secured to part of the outer peripheral portion of the bracket 62. When the pinion 70 is rotated by the driving force of the motor 68, the gear 64 having the pinion 70 meshed with its outer teeth 64A is rotated integrally with the rotating plate 66. A pan frame 20A11 that configures the bottom portion of the cushion frame 20A1 is secured to the upper surface of the rotating plate 66. Because of this, when the motor 68 rotates, the cushion frame 20A1 is rotated integrally with the rotating plate 66 and the gear 64 about a vertical axis of the vehicle body (hereinafter simply called "about the vertical axis").

The center console 26 shown in FIG. 1 is coupled via a center sliding mechanism 72 serving as an obstacle movement mechanism to the floor F of the vehicle body. The center sliding mechanism 72 has basically the same configuration as that of the forward and rearward sliding mechanism 40, and uses the driving force of a motor 74 (see FIG. 8; not shown in drawings other than FIG. 8) to move (slide) the center console 26 in the forward and rearward directions relative to the vehicle body. Specifically, the center sliding mechanism 72 can slide the center console 26 in the forward and rearward directions between a front-row position set between the right and left front-row seats 14 and 16 and a second-row position set between the right and left second-row seats 18 and 20.

Figure 7:
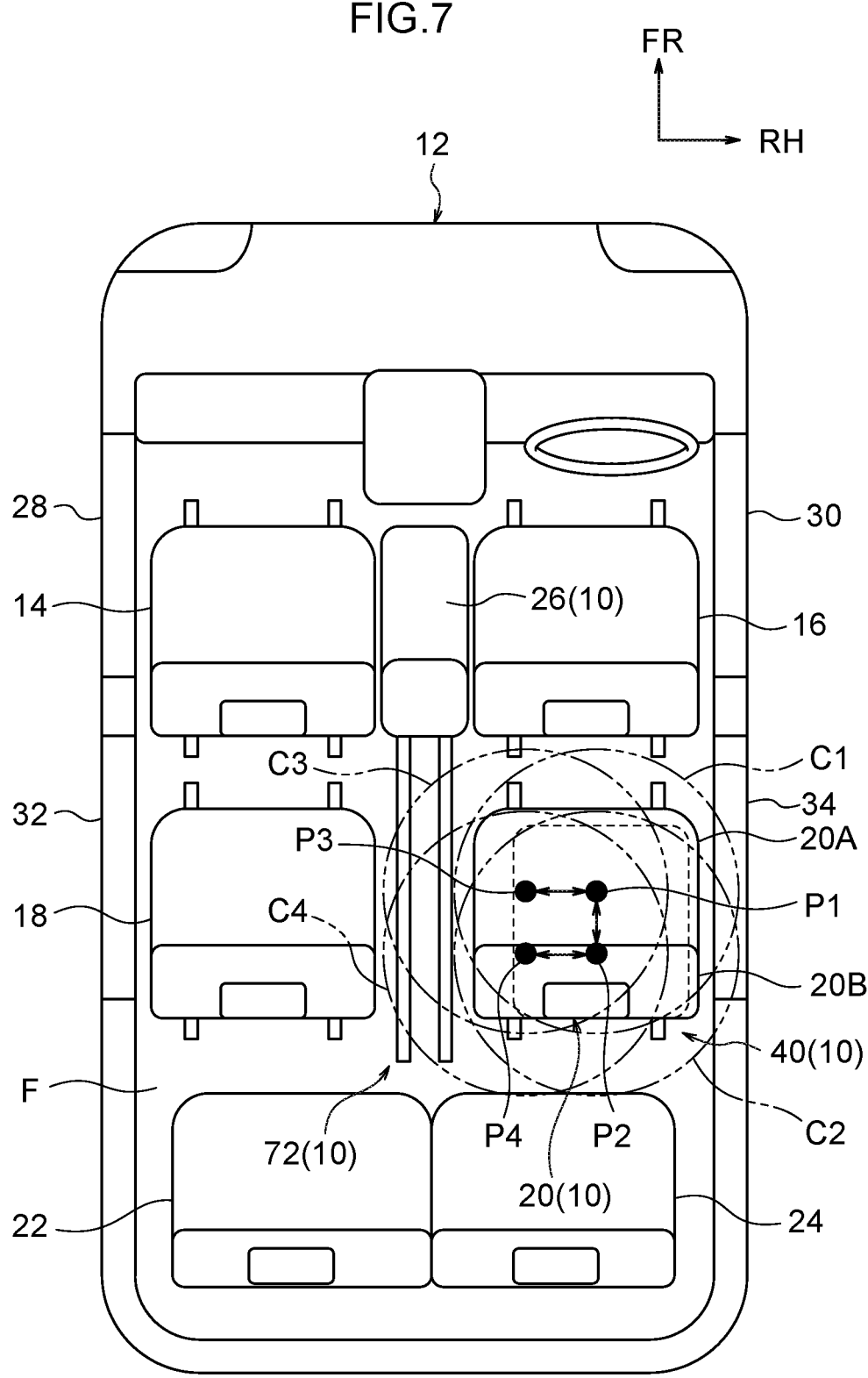
FIG. 7 is a plan view, corresponding to FIG. 1, for describing rotational regions of a seat with which the vehicle seat device is equipped.

Here, in the present embodiment, in a state in which the center console 26 is disposed in the front-row position shown in FIG. 7, the sideways sliding mechanism 42 can slide the second-row seat 20 in the vehicle width direction relative to the vehicle body. The sideways sliding mechanism 42 moves the second-row seat 20 in the vehicle width direction relative to the vehicle body between a normal region in which the second-row seat 20 is normally disposed and an inner region set on the vehicle width direction inner side of the normal region.

It will be noted that hypothetical circle C1 shown in FIG. 7 represents a rotational region when the second-row seat 20 disposed on the frontmost position side of the forward and rearward direction sliding range in the normal region has been rotated about the vertical axis, and point P1 shown in FIG. 7 represents the center of the hypothetical circle C1. Furthermore, hypothetical circle C2 shown in FIG. 7 represents a rotational region when the second-row seat 20 disposed on the rearmost position side of the forward and rearward direction sliding range in the normal region has been rotated about the vertical axis, and point P2 shown in FIG. 7 represents the center of the hypothetical circle C2. Furthermore, hypothetical circle C3 shown in FIG. 7 represents a rotational region when the second-row seat 20 disposed on the frontmost position side of the forward and rearward direction sliding range in the inner region has been rotated about the vertical axis, and point P3 shown in FIG. 7 represents the center of the hypothetical circle C3. Moreover, hypothetical circle C4 shown in FIG. 7 represents a rotational region when the second-row seat 20 disposed on the rearmost position side of the forward and rearward direction sliding range in the inner region has been rotated about the vertical axis, and point P4 shown in FIG. 7 represents the center of the hypothetical circle C4.

As indicated by the hypothetical circles C1 and C2, in a state in which the second-row seat 20 is disposed in the normal region, rotation of the second-row seat 20 about the vertical axis is limited because of interference between the rear side door 34 in the closed state and the second-row seat 20. On the other hand, as indicated by the hypothetical circles C3 and C4, in a state in which the second-row seat 20 is disposed in the inner region, the second-row seat 20 is rotatable about the vertical axis without interfering with the rear side door 34 in the closed state. Furthermore, in a state in which the center console 26 is disposed in the front-row position as shown in FIG. 7, the center console 26 is disposed out of the rotational region of the second-row seat 20.

Figure 8:
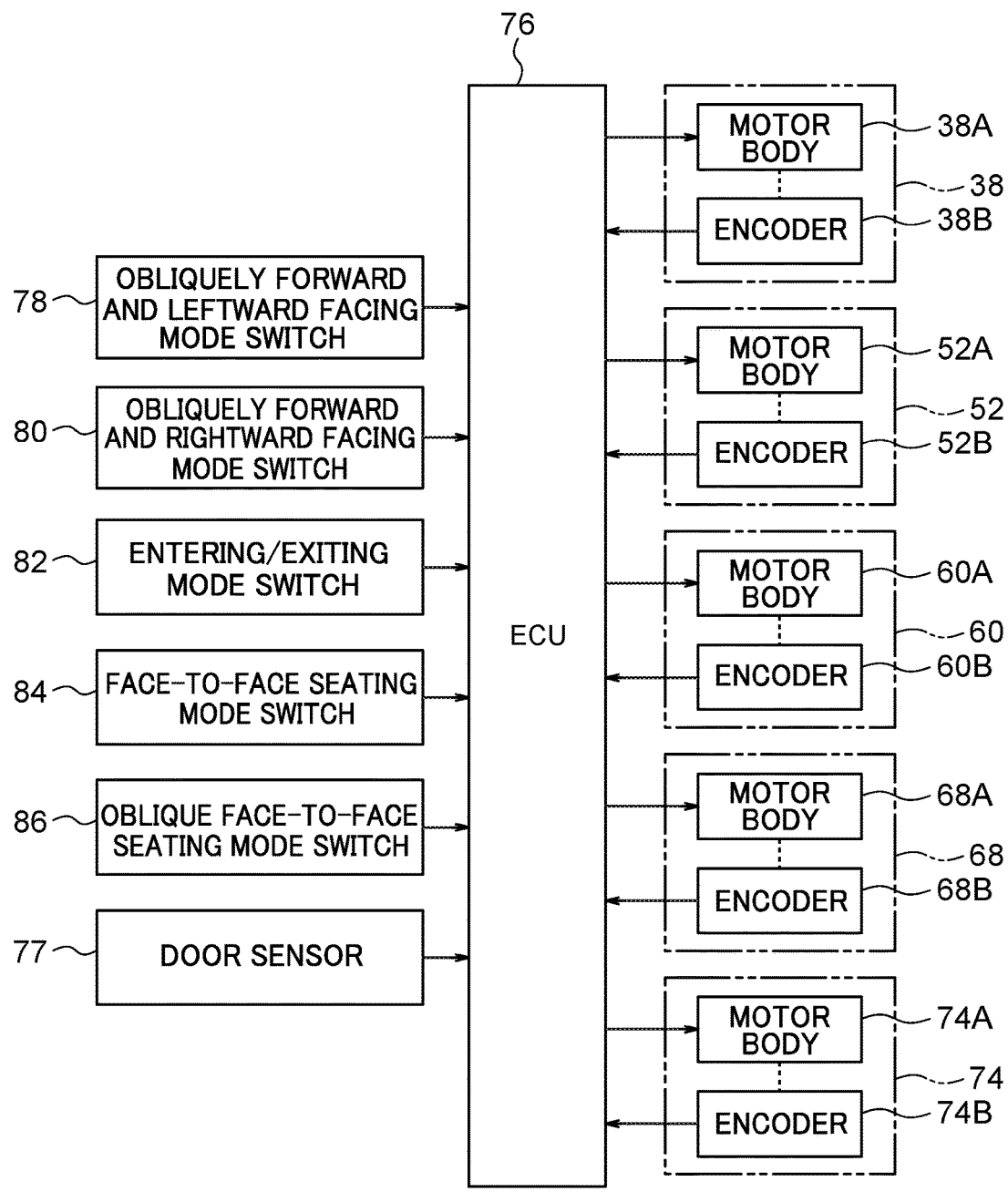
FIG. 8 is a block diagram showing a control system of the vehicle seat device.

Furthermore, in the present embodiment, as shown in FIG. 8, the motors 38, 52, 60, 68, and 74 are equipped with motor bodies 38A, 52A, 60A, 68A, and 74A and encoders 38B, 52B, 60B, 68B, and 74B. The motor bodies 38A, 52A, 60A, 68A, and 74A and the encoders 38B, 52B, 60B, 68B, and 74B are electrically connected to an ECU 76 serving as a control device. The ECU 76 is disposed in the seat cushion 20A of the second-row seat 20, for example. The ECU 76 is equipped with a control component, a ROM, a RAM, an input/output interface, a drive circuit, and the like, which are connected to each other via a bus. A program for controlling the operation of the motors 38, 52, 60, 68, and 74 is stored in the ROM. Furthermore, a door sensor 77 that detects the open/closed state of the rear side door 34 is electrically connected to the ECU 76.

The ECU 76 detects the inclination position of the seat back 20B of the second-row seat 20, the forward and rearward direction position of the second-row seat 20, the rightward and leftward direction position of the second-row seat 20, the rotational position of the second-row seat 20 about the vertical axis, and the forward and rearward direction position of the center console 26 on the basis of detection signals from the encoders 38B, 52B, 60B, 68B, and 74B. An obliquely forward and leftward facing mode switch 78, an obliquely forward and rightward facing mode switch 80, an entering/exiting mode switch 82, a face-to-face seating mode switch 84, and an oblique face-to-face seating mode switch 86 are electrically connected to the ECU 76. When any of these switches 78, 80, 82, 84, and 86 is operated, the control component of the ECU 76 executes the program stored in the ROM while utilizing the temporary storage function of the RAM. Because of this, the ECU 76 causes the second-row seat 20 to rotate to the position corresponding to the mode of each switch.

Here, when the ECU 76 causes the rotating mechanism 44 to rotate the second-row seat 20, the ECU 76 causes the sideways sliding mechanism 42 to move the second-row seat 20 from the normal region to the inner region before the rotation. Furthermore, the ECU 76 causes the center sliding mechanism 72 to move the center console 26 out of the rotational region of the second-row seat 20 before causing the sideways sliding mechanism 42 to move the second-row seat 20 from the normal region to the inner region. Moreover, the ECU 76 causes the forward and rearward sliding mechanism 40 to move the second-row seat 20 to forward and rearward direction reference positions and causes the reclining mechanism to move the seat back 20B to an inclination reference position before causing the sideways sliding mechanism 42 to move the second-row seat 20 from the normal region to the inner region.

Figure 9:
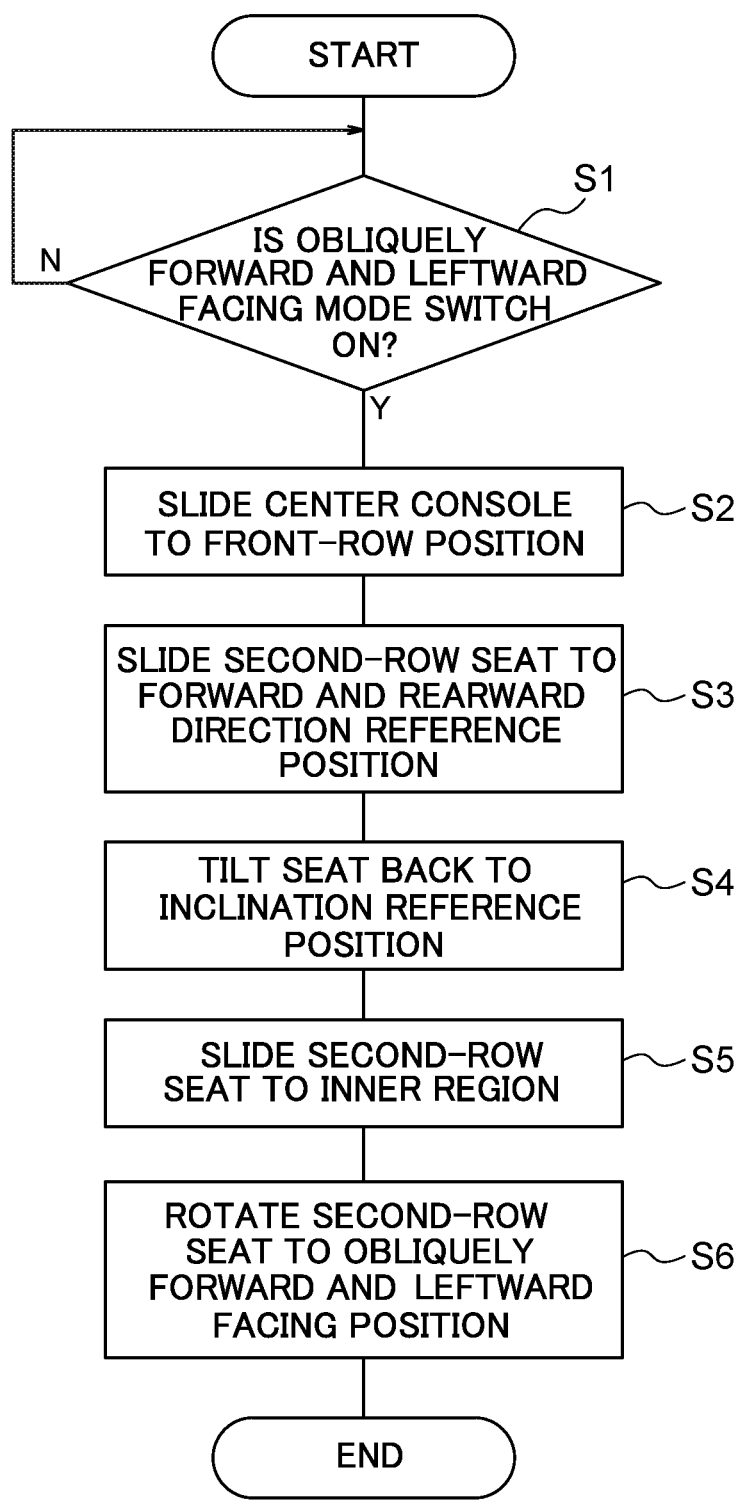
FIG. 9 is a flowchart showing a flow of control by a control device configuring the control system.
Figure 10A:
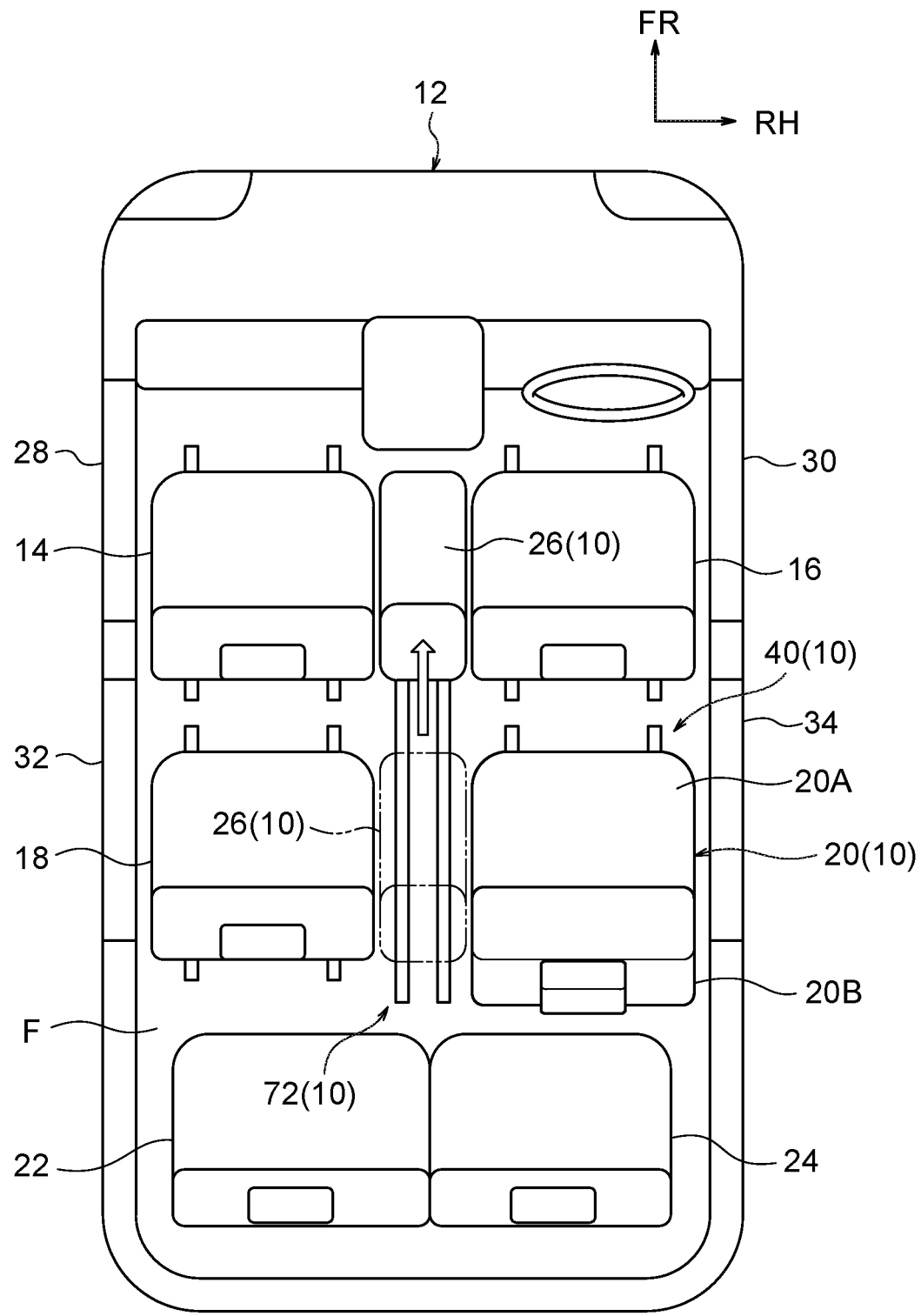
FIG. 10A is a plan view, corresponding to FIG. 1, showing a state in which a center console has been moved out of the rotational region of the seat.

Control by the ECU 76 in a case where the obliquely forward and leftward facing mode switch 78 has been operated will be described below using the flowchart shown in FIG. 9. It will be noted that FIG. 9 shows a flow of control by the ECU 76 in a case where the obliquely forward and leftward facing mode switch 78 has been operated in a state in which the center console 26 is disposed in the second-row position (the position shown in FIG. 1) and the seat back 20B of the second-row seat 20 is reclined as shown in FIG. 10A. First, in step S1 the ECU 76 judges whether or not an ON signal has been output from the obliquely forward and leftward facing mode switch 78. The ECU 76 continues the processing in step S1 in a case where the judgment is NO and moves to step S2 in a case where the judgment is YES.

In step S2 the ECU 76 activates the motor 74 of the center sliding mechanism 72 to slide the center console 26 from the second-row position to the front-row position (see FIG. 10A). The ECU 76 moves to step S3 when this processing in step S2 is completed.

In step S3 the ECU 76 activates the motor 52 of the forward and rearward sliding mechanism 40 to slide the second-row seat 20 to a preset first forward and rearward direction reference position (the position indicated by solid lines in FIG. 10B). The ECU 76 moves to step S4 when this processing in step S3 is completed. It will be noted that in FIG. 10B to FIG. 11E illustration of the forward and rearward sliding mechanism 40, the center sliding mechanism 72, and so forth is omitted in order make the drawings easier to see.

In step S4 the ECU 76 activates the motor 38 of the reclining mechanism 36 to tilt the seat back 20B to a preset inclination reference position (the position indicated by solid lines in FIG. 10C). The ECU 76 moves to step S5 when this processing in step S4 is completed.

Figure 10D:
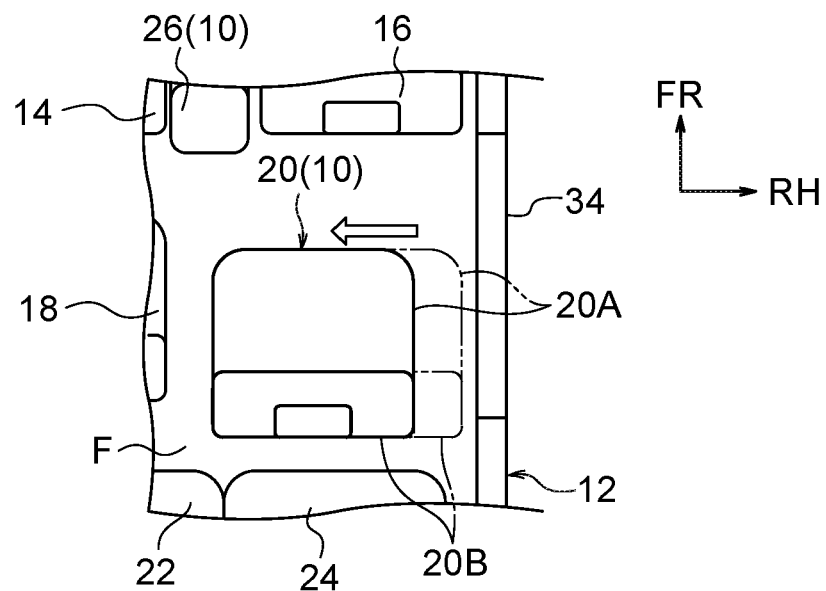
FIG. 10D is a plan view, corresponding to part of FIG. 10A, showing a state in which the seat has been moved to an inner region.

In step S5 the ECU 76 activates the motor 60 of the sideways sliding mechanism 42 to slide the second-row seat 20 from the normal region to the inner region (see FIG. 10D). The ECU 76 moves to step S6 when this processing in step S5 is completed.

Figure 10E:
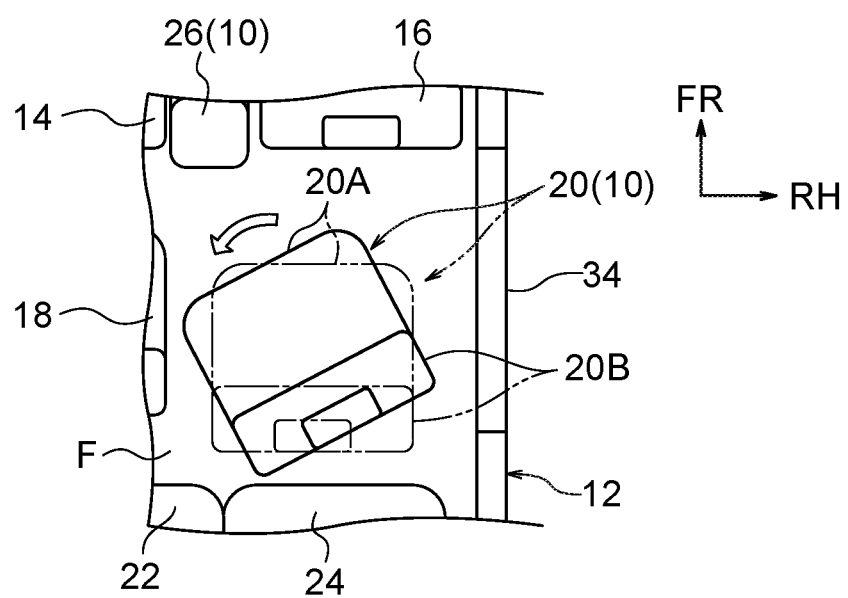
FIG. 10E is a plan view, corresponding to part of FIG. 10A, showing a state in which the seat has been rotated to an obliquely forward and leftward facing position.
Figure 10F:
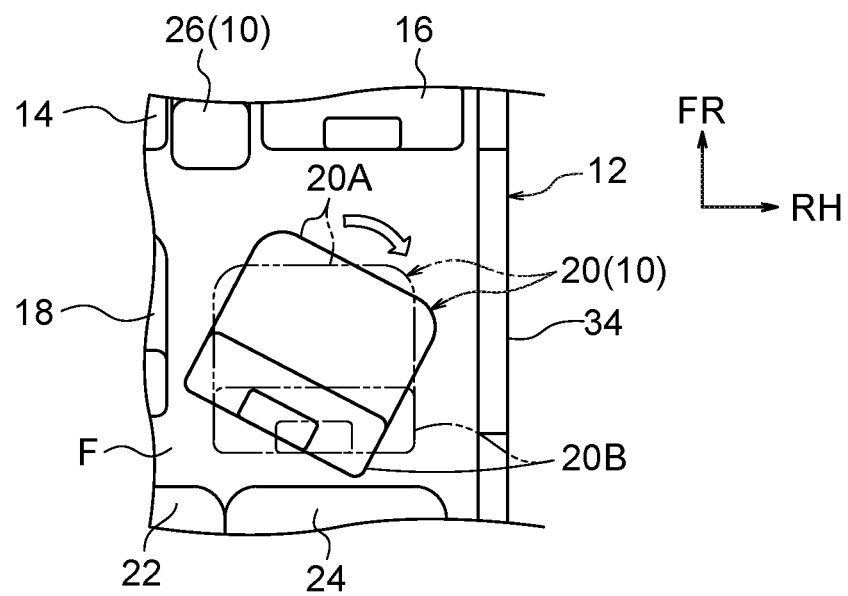
FIG. 10F is a plan view, corresponding to part of FIG. 10A, showing a state in which the seat has been rotated to an obliquely forward and rightward facing position.
Figure 10G:
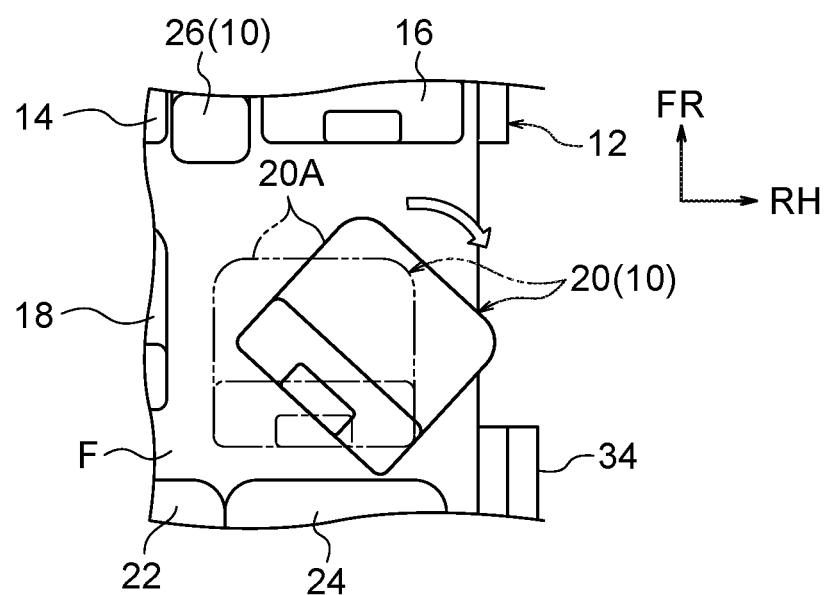
FIG. 10G is a plan view, corresponding to part of FIG. 10A, showing a state in which the seat has been rotated to an entering/exiting position.
Figure 11A:
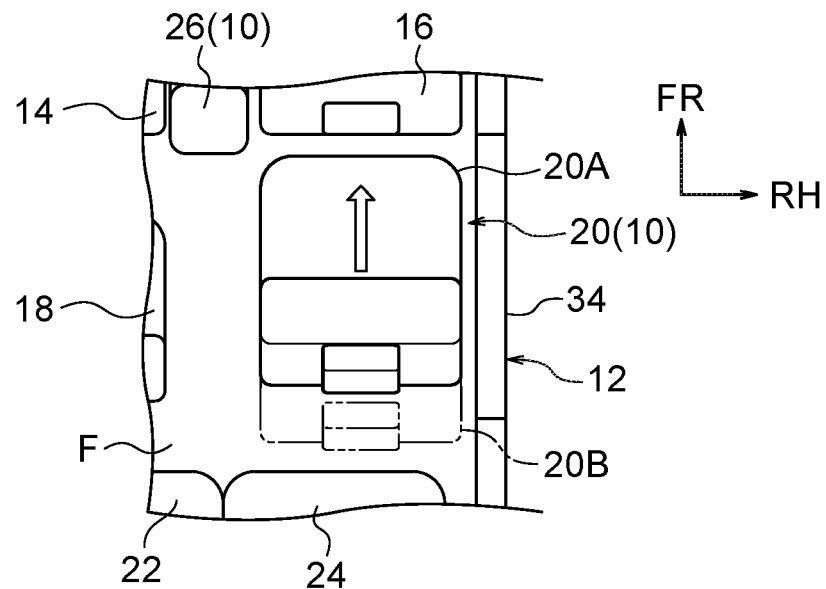
FIG. 11A is a plan view, corresponding to part of FIG. 10A, showing a state in which the seat has been moved to a second forward and rearward direction reference position.
Figure 11B:
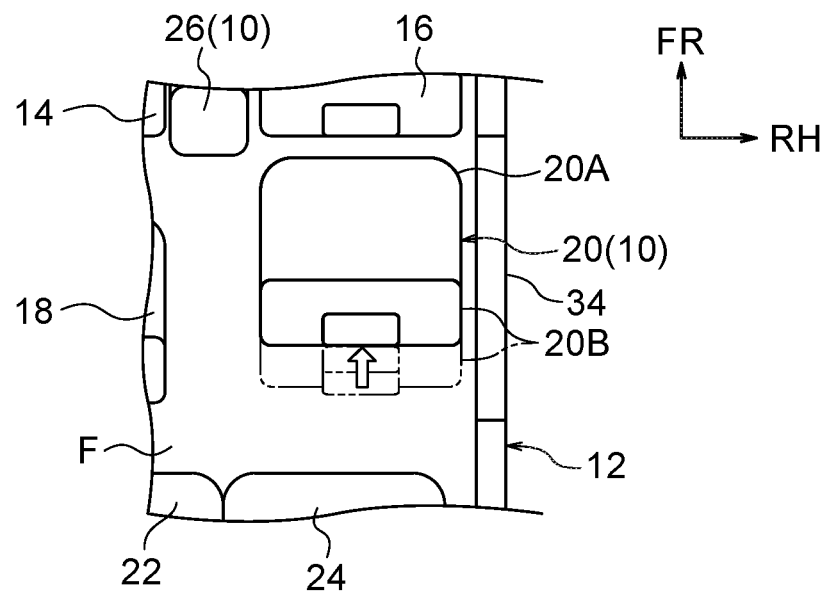
FIG. 11B is a plan view, corresponding to part of FIG. 10A, showing a state in which the seat back has been moved to the inclination reference position.
Figure 11C:
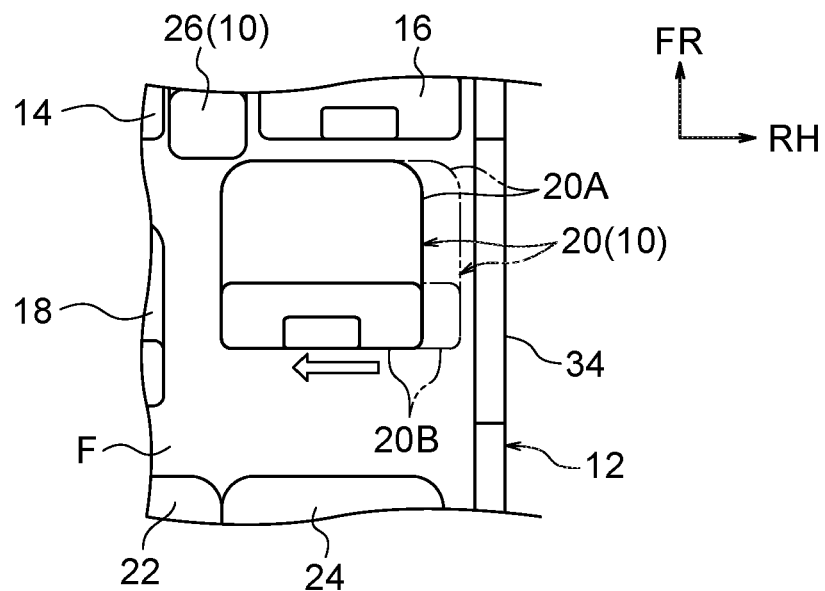
FIG. 11C is a plan view, corresponding to part of FIG. 10A, showing a state in which the seat has been moved to the inner region.
Figure 11D:
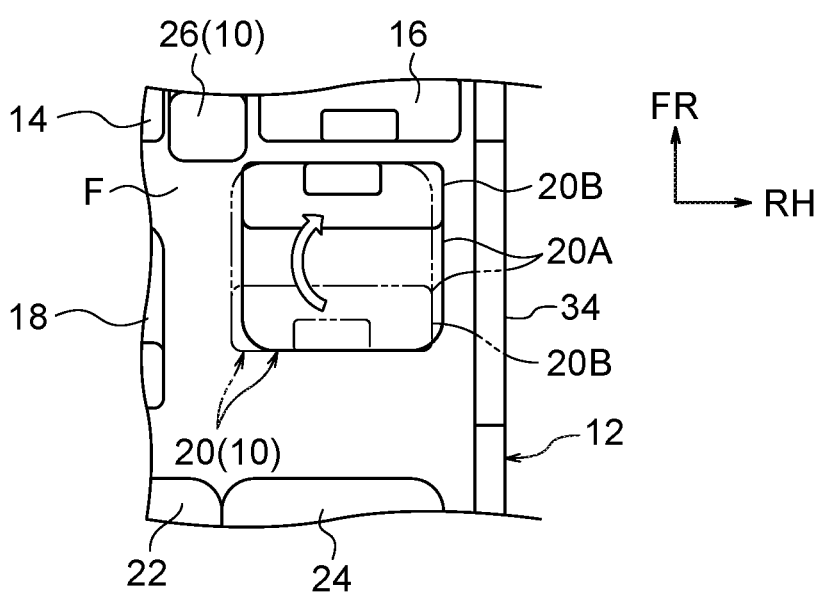
FIG. 11D is a plan view, corresponding to part of FIG. 10A, showing a state in which the seat has been rotated to a face-to-face seating position.
Figure 11E:
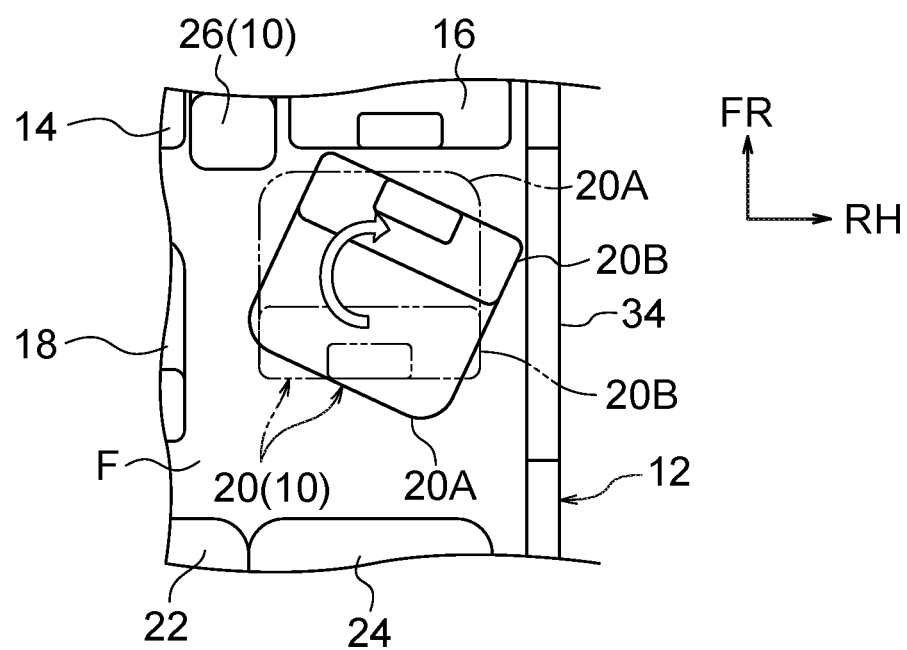
FIG. 11E is a plan view, corresponding to part of FIG. 10A, showing a state in which the seat has been rotated to an oblique face-to-face seating position.

In step S6 the ECU 76 activates the motor 68 of the rotating mechanism 44 to rotate the second-row seat 20 to an obliquely forward and leftward facing position (the position indicated by solid lines in FIG. 10E). The control program is ended when this processing in step S6 is completed.

It will be noted that in a case where the switch that has been operated is the obliquely forward and rightward facing mode switch 80 rather than the obliquely forward and leftward facing mode switch 78, the ECU 76 performs in steps S1 to S5 the same processing as in the case where the obliquely forward and leftward facing mode switch 78 has been operated. Thereafter, in step S6 the ECU 76 causes the second-row seat 20 to rotate to an obliquely forward and rightward facing position (the position indicated by solid lines in FIG. 10F). It will be noted that, in this case, in the present embodiment the amount of movement of the second-row seat 20 inward in the vehicle width direction in step S5 is set smaller than in the case where the obliquely forward and leftward facing switch 78 has been operated.

Furthermore, in a case where the switch that has been operated is the entering/exiting mode switch 82, the ECU 76 performs in steps S1 to S5 the same processing as in the case where the obliquely forward and leftward facing mode switch 78 has been operated. Thereafter, in step S6 the ECU 76 causes the second-row seat 20 to rotate to an entering/exiting position (the position indicated by solid lines in FIG. 10G). It will be noted that, in this case, in the present embodiment the amount of movement of the second-row seat 20 inward in the vehicle width direction in step S5 is set smaller than in the case where the obliquely forward and rightward facing switch 80 has been operated. This also holds true in cases where the face-to-face seating mode switch 84 and the oblique face-to-face seating mode switch 86 have been operated. Furthermore, the ECU 76 enables operation of the entering/exiting mode switch 82 only in a state in which the door sensor 77 detects that the rear side door 34 is open.

Furthermore, in a case where the switch that has been operated is the face-to-face seating mode switch 84, the ECU 76 performs the processing of steps S1 and S2 and thereafter in step S3 causes the second-row seat 20 to move to a second forward and rearward direction reference position (the position indicated by solid lines in FIG. 11A) that is different from in the case where the obliquely forward and leftward facing mode switch 78 has been operated. Next, in steps S4 and S5 the ECU 76 performs the same processing as in the case where the obliquely forward and leftward facing mode switch 78 has been operated (see FIG. 11B and FIG. 11C). Thereafter, in step S6 the ECU 76 causes the second-row seat 20 to rotate to a face-to-face seating position (the position indicated by solid lines in FIG. 11D).

Furthermore, in a case where the switch that has been operated is the oblique face-to-face seating mode switch 86, in steps S1 to S5, the ECU 76 performs the same processing as in the case where the face-to-face seating mode switch 84 has been operated. Thereafter, in step S6 the ECU 76 causes the second-row seat 20 to rotate to an oblique face-to-face seating position (the position indicated by solid lines in FIG. 11E).

Next, the action and effects of the present embodiment will be described.

In the vehicle seat device 10 with the above-described configuration, when the ECU 76 causes the rotating mechanism 44 to rotate, about the vertical axis relative to the vehicle body, the second-row seat 20 disposed on the vehicle width direction inner side of the rear side door 34, the ECU 76 causes the sideways sliding mechanism 42 to move the second-row seat 20 from the normal region to the inner region before the rotation.

In the state in which the second-row seat 20 is disposed in the normal region, rotation of the second-row seat 20 about the vertical axis is limited because of interference between the rear side door 34 in the closed state and the second-row seat 20 (see the hypothetical circles C1 and C2 in FIG. 7). On the other hand, in the state in which the second-row seat 20 is disposed in the inner region, the second-row seat 20 is rotatable about the vertical axis without interfering with the rear side door 34 in the closed state (see the hypothetical circles C3 and C4 in FIG. 7). For this reason, when the second-row seat 20 is moved to the inner region and is subsequently rotated about the vertical axis as described above, interference between the second-row seat 20 and the rear side door 34 is prevented. Moreover, it suffices to ensure space for vehicle width direction movement (sideways sliding) only on the vehicle width direction inner side of the normal region in which the second-row seat 20 is normally disposed, so it becomes easy to ensure the width dimension of the second-row seat 20 (see arrow W in FIG. 1).

Furthermore, in the present embodiment, the vehicle seat device 10 is equipped with the center console 26, which is disposed on the vehicle width direction inner side of the second-row seat 20 positioned in the normal region, and the center sliding mechanism 72, which moves the center console 26 to the front-row position located out of the rotational region of the second-row seat 20. Additionally, the ECU 76 causes the center sliding mechanism 72 to move the center console 26 out of the rotational region of the second-row seat 20 before causing the sideways sliding mechanism 42 to move the second-row seat 20 from the normal region to the inner region. Because of this, even in a configuration equipped with the center console 26, it becomes possible to rotate the second-row seat 20 about the vertical axis in the closed state of the rear side door 34.

Moreover, in the present embodiment, the vehicle seat device 10 is equipped with the forward and rearward sliding mechanism 40, which moves the second-row seat 20 in the forward and rearward directions relative to the vehicle body and which has the first forward and rearward direction reference position and the second forward and rearward direction reference position set in the moving range in the forward and rearward directions, and the reclining mechanism 36, which tilts the seat back 20B of the second-row seat 20 relative to the seat cushion 20A and which has the inclination reference position set in the tilting range of the seat back 20B. Additionally, the ECU 76 causes the forward and rearward sliding mechanism 40 to move the second-row seat 20 to the forward and rearward direction reference positions and causes the reclining mechanism to move the seat back 20B to the inclination reference position before causing the sideways sliding mechanism 42 to move the second-row seat 20 from the normal region to the inner region. That is to say, the second-row seat 20 is moved in the vehicle width direction after the forward and rearward direction position of the second-row seat 20 and the inclination position of the seat back 20B have been adjusted to specific positions. For this reason, compared to a configuration where the second-row seat 20 is moved in the vehicle width direction in a state in which the forward and rearward direction position of the second-row seat 20 and the inclination position of the seat back 20B are unspecified, it becomes easier to prevent interference between the second-row seat 20 and peripheral objects.

It will be noted that although in the present embodiment the vehicle seat device 10 has a configuration equipped with the center console 26 and the center sliding mechanism 72, the vehicle seat device 10 is not limited to this. For example, the vehicle seat device 10 may also have a configuration where the center console 26 and the center sliding mechanism 72 are omitted and the space between the front-row seats 14 and 16 and between the right and left second-row seats 18 and 20 is a walk-through space.

Furthermore, in the present embodiment the vehicle seat device 10 has a configuration where the center console 26 is the obstacle, but the vehicle seat device 10 is not limited to this and may also have a configuration where a center seat, for example, is the obstacle. In that case, a three-person seat is formed by the right and left front-row seats 14 and 16 and the center seat in a state in which the center seat is disposed between the right and left front-row seats 14 and 16, and a three-person seat is formed by the right and left second-row seats 18 and 20 and the center seat in a state in which the center seat is disposed between the right and left second-row seats 18 and 20.

Furthermore, in the present embodiment the vehicle seat device 10 has a configuration where the motors 38, 52, 60, 68, and 74 are equipped with the encoders 38B, 52B, 60B, 68B, and 74B and where the ECU 76 detects the inclination position of the seat back 20B, the forward and rearward direction position of the second-row seat 20, the rightward and leftward direction position of the second-row seat 20, the rotational position of the second-row seat 20 about the vertical axis, and the forward and rearward direction position of the center console 26 on the basis of the detection signals from the encoders 38B, 52B, 60B, 68B, and 74B, but the vehicle seat device 10 is not limited to this. The vehicle seat device 10 may also have a configuration that uses sensors, cameras, and/or switches to detect each of these positions.

Furthermore, in the present embodiment the vehicle seat device 10 may also have a configuration further equipped with a footrest supported so as to be rotatable about a horizontal axis relative to the front end portion of the seat cushion 20A of the second-row seat 20 and a footrest rotating mechanism that rotates the footrest about the horizontal axis relative to the seat cushion 20A. In that case, when, for example, the ECU 76 moves the seat back 20B to the inclination reference position in step S4, the ECU 76 moves the footrest to a stowed position (a position in which the footrest hangs down from the front end portion of the seat cushion 20A).

Furthermore, in the present embodiment the vehicle seat device 10 has a configuration where the second-row seat 20 disposed on the right side of the vehicle 12 is the "seat" pertaining to the present invention, but the vehicle seat device 10 is not limited to this and may also have a configuration where the second-row seat 18 disposed on the left side of the vehicle 12 is the "seat" pertaining to the present invention or a configuration where any or all of the front-row seats 14 and 16 and the third-row seats 22 and 24 are the "seat" pertaining to the present invention.

Moreover, in the present embodiment the vehicle seat device pertaining to the present invention is applied to a minivan type of automobile, but the vehicle seat device pertaining to the present invention is not limited to this and is also applicable to types of automobiles other than a minivan type.

In addition, the present invention can be changed and implemented in a variety of ways to the extent that they do not depart from the spirit of the present invention. Furthermore, the scope of rights of the present invention is of course not limited to the above-described embodiment.

What is claimed is:

1. A vehicle seat device, comprising:
    a seat disposed at a vehicle width direction inner side of a side door of a vehicle;
    a rotating mechanism that rotates the seat individually about a vertical axis relative to a vehicle body;
    a sideways movement mechanism that moves the seat together with the vertical axis, about which the seat rotates, in a vehicle width direction relative to the vehicle body between a normal region, in which the seat is normally disposed and in which rotation about the vertical axis is limited because of interference between the side door in a closed state and the seat, and an inner region, which is set at a vehicle width direction inner side of the normal region and in which the seat is rotatable about the vertical axis without interfering with the side door in a closed state; and
    a control device which, when causing the rotating mechanism to rotate the seat, causes the sideways movement mechanism to move the seat from the normal region to the inner region before the rotation.

2. The vehicle seat device according to claim 1, further comprising:
    an obstacle disposed at a vehicle width direction inner side of the seat positioned in the normal region; and
    an obstacle movement mechanism that moves the obstacle out of a rotational region of the seat,
    wherein the control device causes the obstacle movement mechanism to move the obstacle out of the rotational region before causing the sideways movement mechanism to move the seat from the normal region to the inner region.

3. The vehicle seat device according to claim 2, further comprising:
    a forward and rearward movement mechanism that moves the seat in forward and rearward directions relative to the vehicle body and which has forward and rearward direction reference positions set in a movement range of the forward and rearward directions; and
    a reclining mechanism that tilts a seat back of the seat relative to a seat cushion of the seat and which has an inclination reference position set in a tilting range of the seat back,
    wherein the control device causes the forward and rearward movement mechanism to move the seat to the forward and rearward direction reference positions and causes the reclining mechanism to move the seat back to the inclination reference position before causing the sideways movement mechanism to move the seat from the normal region to the inner region.

4. The vehicle seat device according to claim 1, further comprising:
    a forward and rearward movement mechanism that moves the seat in forward and rearward directions relative to the vehicle body and which has forward and rearward direction reference positions set in a movement range of the forward and rearward directions; and
    a reclining mechanism that tilts a seat back of the seat relative to a seat cushion of the seat and which has an inclination reference position set in a tilting range of the seat back,
    wherein the control device causes the forward and rearward movement mechanism to move the seat to the forward and rearward direction reference positions and causes the reclining mechanism to move the seat back to the inclination reference position before causing the sideways movement mechanism to move the seat from the normal region to the inner region.

* * * * *